Dec. 17, 1963  H. J. SCHWERDHÖFER  3,114,442
MULTI-SPEED COASTER BRAKE
Filed Dec. 8, 1959  2 Sheets-Sheet 1

INVENTOR:
HANS JOACHIM SCHWERDHÖFER
BY
Richardson, David and Norton
Atty's

Dec. 17, 1963  H. J. SCHWERDHÖFER  3,114,442
MULTI-SPEED COASTER BRAKE
Filed Dec. 8, 1959  2 Sheets-Sheet 2
FIG. 2
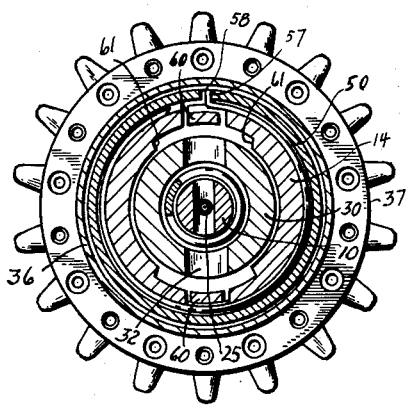
FIG. 3
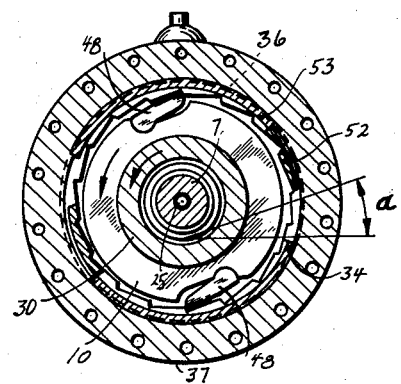
FIG. 4 — DRIVING
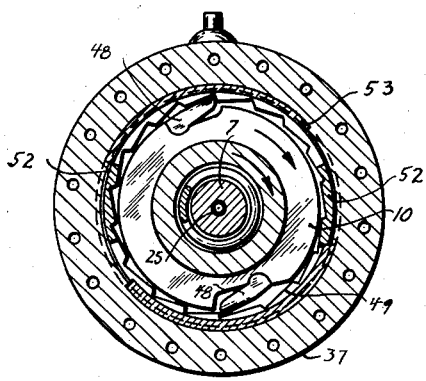
FIG. 5
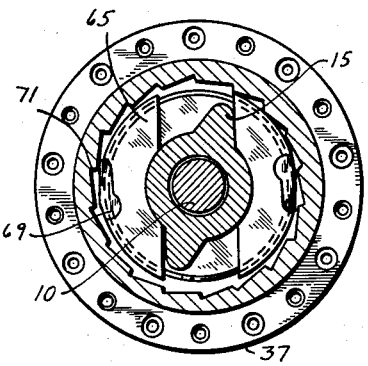
FIG. 6
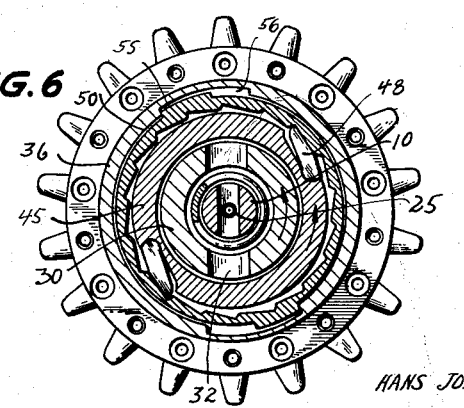
INVENTOR:
HANS JOACHIM SCHWERDHÖFER
BY
Richardson, David and Nerdon
ATTYS

United States Patent Office 3,114,442
Patented Dec. 17, 1963

3,114,442
MULTI-SPEED COASTER BRAKE
Hans Joachim Schwerdhöfer, Schweinfurt (Main), Germany, assignor to Fichtel & Sachs A.G., Schweinfurt (Main), Germany, a corporation of Germany
Filed Dec. 8, 1959, Ser. No. 858,181
Claims priority, application Germany Dec. 13, 1958
4 Claims. (Cl. 192—6)

The present invention relates to multi-speed coaster brakes and more particularly to a coaster brake of this character wherein simplified means are provided for preventing locking of the brake.

Briefly, the invention comprises the interposition of a driving ring providing lost motion between the hub shell to which the spokes are attached and the drive mechanism of the unit. A ratchet mechanism is provided which transmits torque to the hub shell in high speed and normal speed drive. This ratchet mechanism transmits torque to the hub shell through a driving ring member. There is lost motion or play between the driving ring member and the hub shell, this lost motion being of an angular extent the magnitude of which is at least as great as the angular spacing between two adjacent teeth of the ratchet mechanism. This lost motion prevents the brake from being locked in the braking condition by the ratchet mechanism.

Additionally, a friction coupling is provided between the driving ring and the gearing for positively taking up the lost motion prior to braking.

Various objects, features and advantages of the invention will become apparent from the following description, reference being had to the accompanying drawing forming a part hereof.

Referring to the drawing:

FIGURE 2 is a transverse sectional view taken along the line II—II of FIG. 1, looking in the direction of the arrows.

FIGURE 3 is a transverse sectional view taken along the line III of FIG. 1 looking in the direction of the arrows under braking conditions.

FIGURE 4 is similar to FIG. 3 except that the parts are shown under driving conditions.

FIGURE 5 is a transverse sectional view taken along the line V—V of FIG. 1, looking in the direction of the arrows.

FIGURE 6 is a view similar to FIG. 2, except that a modified arrangement is illustrated for providing the lost motion between the driving ring member and the hub shell.

Figure 1:
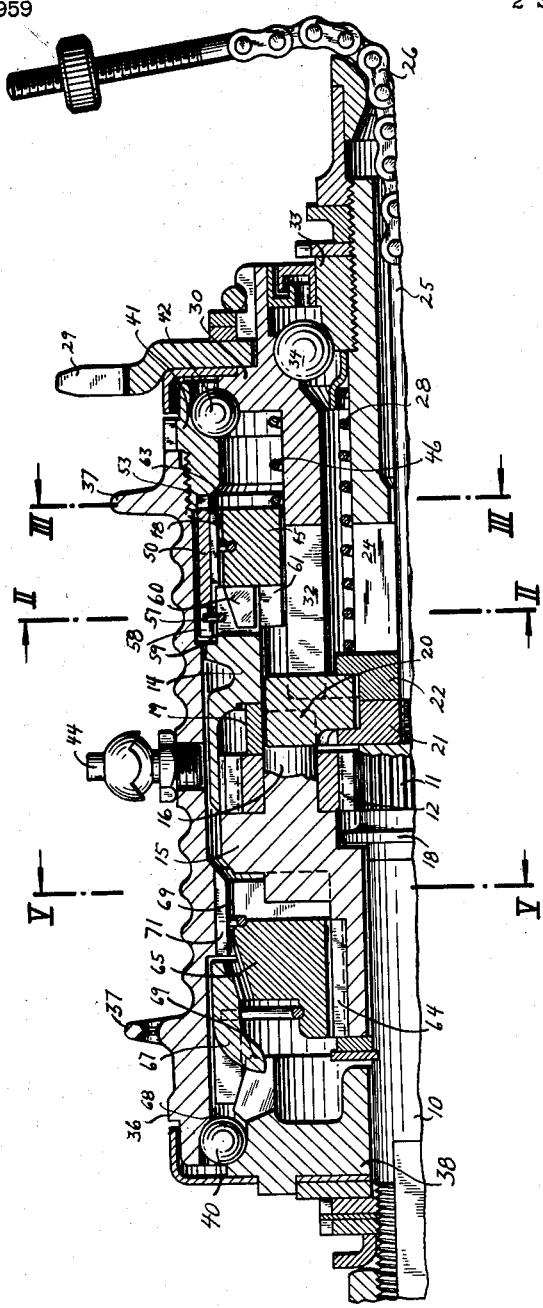
FIGURE 1 is a rear view in axial section of the upper half of a three-speed coaster brake embodying the invention, the lower half being omitted for simplicity of illustration. The coaster brake is shown in high speed drive position.

Referring to FIG. 1, the three-speed coaster brake mechanism is mounted on a fixed axle 10, the right hand portion of which is hollow. A fixed sun gear 11 is formed integrally with the axle 10. A plurality of symmetrically arranged planet gears 12 of which only one is visible in FIG. 1 of the drawing, mesh continuously with the sun gear 11. An internally toothed ring gear member 14 meshes continuously with the planet gears 12. The planet gears 12 are mounted on a planet carrier 15. Each of the planet gears 12 is individually journaled on a pin 16 integrally formed with the planet carrier 15. The planet carrier 15 is held against axial movement by a flange 18 integral with the axle 10. The planet gears 12 are collectively held against axial movement by a collar 19 mounted on the ring gear member 14.

The pins 16 extend beyond the planet gears 12 for lateral engagement with an axially displaceable driving member 20 in the high speed drive condition, as shown in FIG. 1. The axially displaceable driving member 20 is mounted between two flanged guide blocks 21 and 22 which are disposed in a slot 24 formed in the axle 10. The guide block 21 is threaded on the end of a control rod 25 which is connected by a pull chain 26 to a three-position gear shift lever (not shown). The guide blocks 21 and 22 are yieldingly urged toward the left, as viewed in FIG. 1, by a helical compression spring 28 surrounding the axle 10. The guide blocks 21 and 22 may be moved, as a unit, toward the right by the pull chain 26 to the normal speed and low speed positions against the pressure of the compression spring 28 and the drive member 20 is axially displaced accordingly.

A sprocket wheel 29, adapted to be driven by a bicycle chain (not shown), is fixed on a tubular drive member 30 having axial slots 32 formed therein which extend toward the right from the free end of the member 30. The axially displaceable drive member 20 is slidably received in the slots 32 so that it is continuously in engagement with the tubular drive member 30 and is positively driven by the sprocket wheel 29 in all three axially spaced positions of the drive member 20. The sprocket wheel 29 together with the tubular and displaceable drive members 30 and 20, respectively, will always rotate as a unit.

A ball race ring 33 is fixed on the axle 10. The slotted tubular drive member 30 is freely revolubly supported on the ring 33 by ball bearings 34. A cylindrical hub shell, designated generally as 36, is provided with apertured flanges 37 to which the wheel spokes (not shown) are adapted to be connected. A fixed ball race member 38 is mounted on the axle 10. The left hand end of hub shell 36 is freely revolubly supported on the ball race member 38 by ball bearings 40. The right hand end of the hub shell 36 is fixedly connected to a ball race ring 41. The ring 41 is, in turn, freely revolubly mounted on the tubular drive member 30 by ball bearings 42. An oil cup 44 for the injection of lubricant into the coaster brake mechanism is mounted centrally on the hub shell 36.

An annular pawl carrier 45 is freely revolubly and axially slidably mounted on the tubular drive member 30. The pawl carrier 45 is yieldingly urged toward the left by a helical compression spring 46 surrounding the tubular drive member 30. The pawl carrier 45 carries two outwardly spring-pressed drive pawls 48 which engage ratchet teeth 49 formed on the inner surface of a driving ring member 50. The driving ring 50 is provided with two short axially extending projections 52 which engage corresponding oppositely axially extending projections 53 formed on the ball race ring 41, the ball race ring 41 being fixed to the hub shell 36, as noted above. The projections 52 and 53 are so dimensioned that there is play or lost motion between them and hence between the drive ring 50 and the hub shell 36. As indicated in FIG. 3, this lost motion permits free relative rotation through an angle α between the hub shell 36 and the drive ring 50. The amount of free relative angular displacement which is permitted by the lost motion is at least as great as the angular spacing between two successive ratchet teeth 49.

FIG. 6 illustrates a modification wherein the lost motion is provided by radial projections 55 formed on the drive ring member 50. The projections 55 extend into circumferentially elongated recesses 56 formed in the hub shell 36. The recesses 56 are dimensioned to permit lost motion or play between the driving ring 50 and the hub shell 36 as in the case of the interengaging axial projections 52 and 53 described above.

The drive ring 50 carries a circular spring 57 one end of which is fitted in a notch 58 in the drive ring 50. The spring 57 frictionally couples the drive ring 50 to the ring gear member 14.

The ring gear member 14 is provided with axially extending slots 59 in which projections 60 formed on the pawl carrier 45 are received in both the high speed and normal speed positions of the displaceable driving member 20. The driving ring 50 is thus coupled to the ring gear member 14 in both the high and normal speed conditions of the gearing. The ring gear member 14 is also provided with projections 61 which are engageable with the axially displaceable driving member 20 in the normal and low speed conditions of the gearing. The ball race ring 41 is provided with a sloping edge 63 which disengages the pawls 48 from the ratchet teeth 49 of the drive ring member 50, when the pawl carrier 45 is displaced toward the right by the driving member 20 in the low speed condition of the gearing.

The left hand portion of the planet carrier 15 has a helical thread 64, preferably of square thread shape, formed thereon. A brake cone member 65 is in threaded engagement with the square helical thread 65 and is forced toward the left in response to reverse rotation of the planet carrier 15 accompanying back pedaling. When moved toward the left, the brake cone member 65 forces a brake ring 67 to expand laterally against an inner braking surface 68 formed on the hub shell 36. The brake ring 67 comprises an inwardly extending projection 69 which engages the fixed ball race member 38 and holds the brake ring 67 against rotation with the hub shell 36.

The brake cone 65 carries two low-speed driving pawls 69 which engage ratchet teeth 71 formed on the inner surface of the hub shell 36.

The operation of the device is as follows:

1. HIGH SPEED

(a) *Drive*

In high speed drive, as shown in FIG. 1, the displaceable drive member 20, which is driven by the sprocket wheel 29, engages the free ends of the pins 20 on which the planet gears 12 are mounted. The planet carrier 15 is thus directly driven by the sprocket wheel 29. The planet gears 12 meshing with the sun gear 11 drive the ring gear member 14 at a higher angular velocity than that of the sprocket wheel 29. The ring gear member 14 is coupled to the pawl carrier 45 by the projections 60 on the pawl carrier 45 which are received in the slots 59 of the ring gear member. The pawls 48 of the pawl carrier 45 engage the ratchet teeth 49 of the drive ring 50. After the lost motion between the drive ring 50 and the ball race ring 41 has been taken up in the forward direction, the drive ring 50 drives the hub shell 36 at high speed through the ball race ring 41.

(b) *Braking*

Upon back pedaling, the axially displaceable driving member 20 rotates the planet carrier 14 in the reverse direction and the thread 64 forces the brake cone 65 toward the left expanding the brake ring 67. The ball race ring 41, after taking up the lost motion, drives the driving ring 50 so that it overruns the pawls 48 of the pawl carrier 45. Thus, even if the rotation of the hub shell 36 is stopped by the brake ring 67 with one of the pawls 48 having just engaged one of the ratchet teeth 49, forward brake releasing movement of the sprocket wheel 29 will be permitted to the extent of the lost motion. This play or lost motion positively permits brake releasing movement of the planet carrier 15 independently of the prevention of such brake releasing movement which could otherwise be caused by the pawls 48.

(c) *Coasting*

When coasting, the drive ring member 50 turns with the hub shell 36 and the ratchet teeth 49 overrun the pawls 48. The remainder of the mechanism is stationary. When coasting, the drive ring 50 turns with the hub shell 36 after the play or lost motion has been taken up. Since the ring gear member 14 is always stationary during coasting in all three speeds of the gearing, the friction spring 57 which couples the ring gear member 14 to the drive ring 50 tends to hold the drive ring 50 stationary and thus positively assures taking up of the lost motion which is needed for prevention of locking of the brake.

Without the friction spring 57, if a stickiness should develop between the interengaging axial projections 52 and 53 on the drive ring 50 and ball race ring 41, respectively, the drive ring 50 might have sufficient torque to turn with the ball race ring 41 and overrun the pawls 48 of the pawl carrier 45 without providing any lost motion for brake releasing movement of the sprocket wheel 29. Such a lack of lost motion would permit the brake to be locked in braking position by the pawls 48. The friction spring, however, tends to hold the drive ring 50 against rotation with the ball race ring 41 when the ring gear member 14 is stationary during coasting and immediately prior to braking. This frictional torque is sufficient to insure movement of the drive ring 50 relative to the ball race ring 41 so that the desired lost motion will be provided for brake releasing.

2. NORMAL SPEED

(a) *Drive*

The displaceable drive member 20 is moved toward the right so that it is disengaged from the pins 16 of the planet carrier 15 and engages the projections 61 of the ring gear member 14. The ring gear member 14, which remains coupled to the pawl carrier 45 by the projections 60 on pawl carrier 45, drives the drive ring 50 through the pawls 48 as in the case of high speed drive, as described above. The planet gears 12 idle around the sun gear 11 and turn the planet carrier 15 in the forward direction at reduced speed and without load.

(b) *Braking*

Upon back pedaling, the ring gear member 14 is driven in the reverse direction. The planet gears 12 then drive the planet carrier 15 in the reverse direction and force the brake cone 65 toward the left, thereby expanding the brake ring 67. The lost motion between the drive ring 50 and the ball race ring 41 is taken up, as in the case of high speed braking described above. In the case of FIG. 6, the lost motion provided by the recesses 56 in hub shell 36 is taken up. As in the case of high speed braking, forward brake releasing movement of planet carrier can always be produced independently of the pawls 48 by reason of the lost motion.

(c) *Coasting*

The drive ring 50 which rotates with the hub shell 36 overruns the pawls 48 which are stationary. The remainder of the mechanism is also stationary.

3. LOW SPEED

(a) *Drive*

The displaceable driving member 20 is moved to its extreme right hand position. The pawl carrier 45 is moved to the right so that the pawls 48 are forced inwardly by the sloping edge 63 of the ball race ring 41 and are thus disengaged from the ratchet teeth 49 of the driving ring 50. The projections 60 of pawl carrier 45 are also disengaged from the slots 59 of the ring gear member 15. In this condition, the pawl carrier 45 and pawls 48 are inoperative. The displaceable driving member 20 remains in engagement with the projections 61 on the ring gear member 14 and the ring gear member 14 is thus driven by the sprocket wheel 29. The planet gears 12 then drive the planet carrier 15 at reduced speed with respect to the sprocket wheel 29. The brake cone 65, having reached the limit of movement toward the right which is permitted by the thread 64, is driven in the forward direction by the planet carrier 15 and the low speed pawls 69 carried by the brake cone 65 engage the ratchet teeth 71 formed directly on the hub shell 36. The hub shell 36 is then driven at low speed in the forward direction.

(b) *Braking*

Back pedaling produces reverse rotation of the planet carrier 15 and the thread 64 forces the brake cone 65 toward the left to expand the brake ring 67. No lost motion is needed in the low speed condition because the pawls 69, which are carried by the brake cone 65, do not interfere with brake releasing rotation of the planet carrier 15 by the sprocket wheel 29.

While I have shown and described what I believe to be the best embodiments of my invention, it will be apparent to those skilled in the art that various changes may be made therein without departing from the spirit and scope of the invention as defined in the appended claims.

What is claimed is:

1. A multi-speed coaster brake mechanism of the class described, comprising: a hub shell member, a sprocket wheel, changeable ratio gearing driven by said sprocket wheel, braking means acting on said hub shell and actuable in response to reverse rotation of said sprocket wheel, driving ring means coupled to said hub shell member with lost motion therebetween, ratchet means driven by said gearing and disposed to drive said driving ring means in the forward direction only, said ratchet means permitting free rotation of said hub shell member in the forward direction, said ratchet means including a series of circularly arranged ratchet teeth, the angular spacing between two adjacent teeth being less than the angular extent of said lost motion, and friction means coupling said driving ring means to said gearing, whereby said lost motion will be positively taken up when said gearing is stationary.

2. A multi-spaced coaster brake according to claim 1, further comprising axially extending projections connected for rotation with said hub shell member and oppositely axially extending projections connected for rotation with said driving ring means, said driving ring means being coupled to said hub shell member by interengagement of said projections, said projections being circumferentially spaced to provide said lost motion.

3. A multi-speed coaster brake according to claim 1, wherein said hub shell member has circumferentially elongated recesses formed therein and said driving ring means has projections which extend into said recesses for coupling said driving ring member to said hub sleeve, said recesses allowing circumferential movement of said projections therein to an extent sufficient to provide said lost motion.

4. A multi-speed coaster brake mechanism of the class described, comprising a hub shell member, a sprocket wheel, changeable ratio gearing driven by said sprocket wheel, braking means acting on said hub shell member and actuable in response to reverse rotation of said sprocket wheel, an axially displaceable pawl carrier driven by said gearing, a drive ring member coupled to said hub shell member with lost motion therebetween, said drive ring member having ratchet teeth formed thereon engageable by said pawl carrier for forward driving of said hub shell member in at least one predetermined position of axial displacement thereof, the angular spacing between adjacent ratchet teeth being less than the angular extent of said lost motion, manually controllable means for simultaneously changing the ratio of said gearing and displacing said pawl carrier, and friction means coupling said drive ring member to said gearing for positively taking up said lost motion prior to actuation of said braking means.

References Cited in the file of this patent

UNITED STATES PATENTS

| | | |
|---|---|---|
| 813,464 | Svenson | Feb. 27, 1906 |
| 894,516 | Maynes | July 28, 1908 |
| 1,277,070 | Harrison | Aug. 27, 1918 |
| 2,816,634 | Brown | Dec. 17, 1957 |
| 2,895,576 | Schwerdhofer | July 21, 1959 |
| 2,899,030 | Douglas et al. | Aug. 11, 1959 |

FOREIGN PATENTS

| | | |
|---|---|---|
| 1,033,064 | Germany | June 26, 1958 |